United States Patent [19]
Maranto

[11] Patent Number: 5,212,753
[45] Date of Patent: May 18, 1993

[54] POLARIZATION PRESERVING FIBER OPTIC TERMINUS

[75] Inventor: Jack J. Maranto, Capistrano Beach, Calif.

[73] Assignee: Hughes Aircraft Company, Los Angeles, Calif.

[21] Appl. No.: 841,123

[22] Filed: Feb. 25, 1992

[51] Int. Cl.$^5$ .............................................. G02B 6/26
[52] U.S. Cl. ..................................... 385/80; 385/76; 385/77; 385/90
[58] Field of Search ....................... 385/76, 77, 78, 80, 385/90, 91

[56] References Cited

U.S. PATENT DOCUMENTS

| | | | |
|---|---|---|---|
| 4,838,639 | 6/1989 | Morankar et al. ................ | 385/91 X |
| 4,848,867 | 7/1989 | Kajioka et al. .................... | 385/73 X |
| 4,907,853 | 3/1990 | Hiratsuka .............................. | 385/60 |

*Primary Examiner*—Frank Gonzalez
*Assistant Examiner*—S. Barns
*Attorney, Agent, or Firm*—Terje Gudmestad; Wanda K. Denson-Low

[57] ABSTRACT

Polarization of the optical fibers (24, 32) of pin-and-socket-type optical fiber termini is provided by extending a sleeve (44) around an optical fiber terminus (15, 26), positioning the optical fiber terminus in a body (11, 12) with the sleeve (44) and body having means for positioning the sleeve (44) in predetermined rotational position, then rotating the optical fiber terminus (15, 26) until its fiber (24, 32) achieves a known polarization, and bonding the fiber and sleeve together by an adhesive (57). The terminus (15, 26) and sleeve (44) may be removed from the body (11, 12) and placed in an optical fiber connector (64, 67) by positioning the sleeve in a known rotational position relative to the connector, which will cause the optical fiber to have a predetermined polarization in the optical fiber connector.

12 Claims, 1 Drawing Sheet

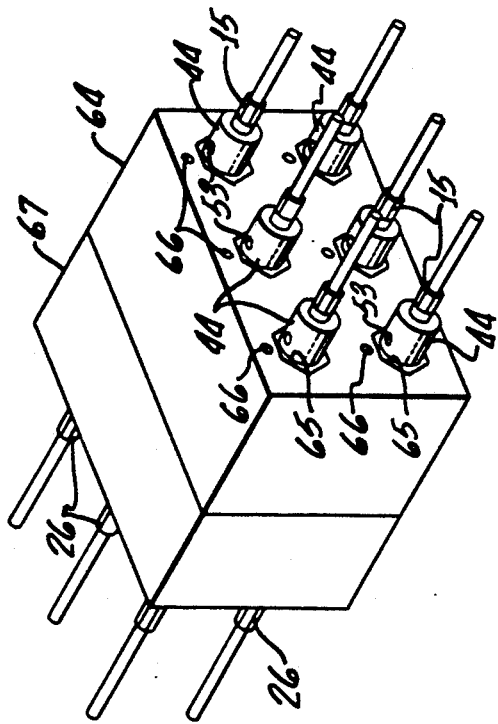
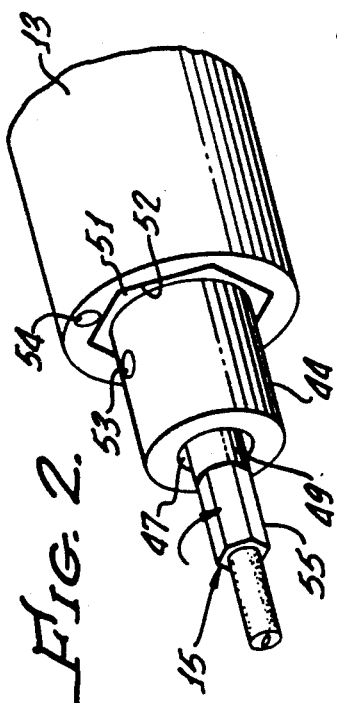
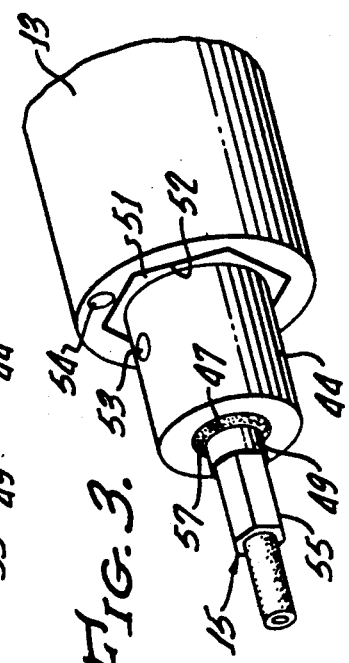
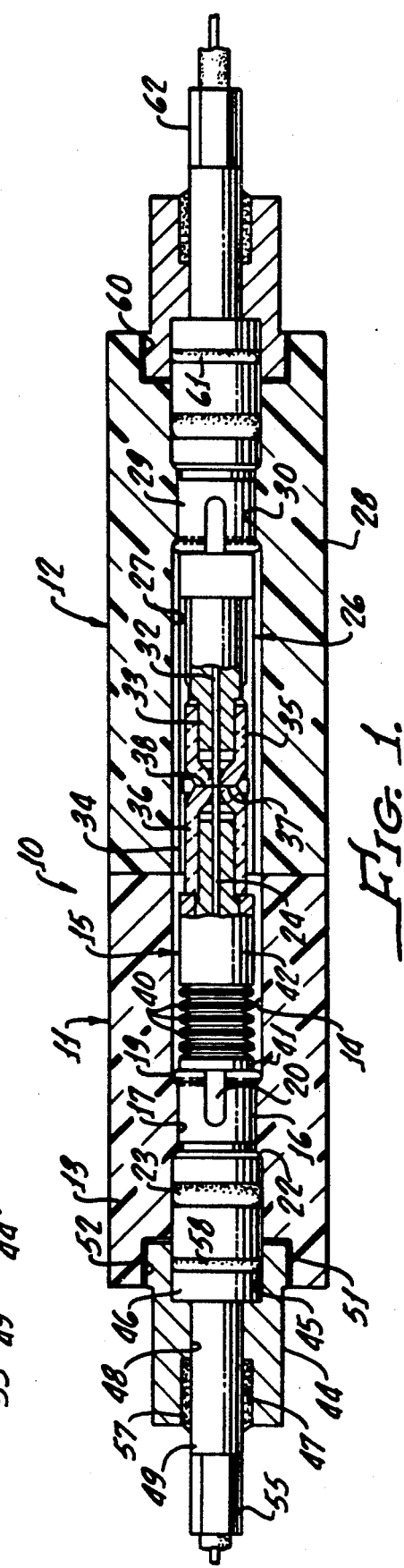

POLARIZATION PRESERVING FIBER OPTIC TERMINUS

BACKGROUND OF THE INVENTION

1. Field of the Invention

This invention relates to optical fiber connectors, in particular, to obtaining proper polarity of polarization preserving fibers

2. Description of Related Art

The use of polarization preserving fibers (PPF) is increasing greatly and expected to experience rapid growth in the future. The capacity of standard single-mode optical fibers has been exceeded for such uses as phased array radar systems and ultra high speed data applications. This has made necessary the use of polarization preserving fibers.

Because polarization preserving fibers must achieve a predetermined rotational alignment, normal optical fiber interconnection techniques cannot be used. In a conventional multi-channel optical fiber connector the mating optical fibers are not rotationally controlled, which is not acceptable for the interconnection of polarization preserving fibers.

In order to accurately mate polarization preserving fibers it has been necessary to fusion-splice the fibers in a special fusion-splicing machine. The result is a permanent attachment which cannot be separated. The mating of fibers thus has become expensive, time consuming and inflexible. Such connections are impractical for field use where fiber separation may be necessary.

Prior attempts to provide connectors for polarization preserving fibers have been either not optically repeatable or not environmentally acceptable.

SUMMARY OF THE INVENTION

The present invention provides an arrangement by which polarization preserving fibers may be employed in multi-channel connectors which can be separated and reconnected without sacrifice of optical qualities. Connectors may be made environmentally secure much as for connectors used with standard single-mode fibers.

In accordance with the invention a pin or socket-type optical fiber terminus with its fiber bonded in place is introduced into a connector body, which may be part of a special connector for alignment purposes only. A sleeve having a counterbore at its outer end is fitted around the terminus prior to positioning the terminus in the opening in the connector body. The sleeve has a noncircular portion, such as a portion of hexagonal shape, which fits into a complementary socket at the end of the opening in the connector body. A marking on the exterior of the sleeve is aligned with a marking on the connector body so that the sleeve is in a predetermined rotational alignment with the connector body.

Next, the optical fiber terminus is rotated relative to the connector body and to the sleeve until a predetermined polarization of the fiber is achieved This may be accomplished, for example, by mating with another connector body in which is an optical fiber terminus having a predetermined polarization. Measurement of a light signal transmitted between the two fibers will indicate when proper polarization has been achieved for the optical fiber in question When this occurs the sleeve and the optical fiber terminus are bonded together. Rotation of the terminus is facilitated by providing a hexagonal section or other surface on the outer end of the terminus which can be engaged with a wrench. The sleeve may be provided with a counterbore at its outer end into which an adhesive such as an epoxy resin may be injected for bonding the sleeve to the fiber. It is preferred to provide an O-ring inwardly of the counterbore to assure that no adhesive will bleed through to the connector interface.

The unitary sleeve and terminus then may be removed from the connector body and returned to the same polarization of the fiber by simply inserting the sleeve into the socket in the connector body with the markings suitably aligned. Normally, however, the terminus and sleeve are associated with a multi-channel optical fiber connector body which is provided with a similar socket and indicia for each of the openings to receive a terminus. In that manner all of the termini in an optical fiber connector may be given a rotational orientation which will provide the same polarization for all of the optical fibers of the connector. This technique may be followed for both pin and socket-type optical filter termini and both halves of a connector may be aligned in the same manner. The connector prepared in this fashion can be mated and unmated repeatedly without loss of optical fiber properties and an individual terminus may be removed and replaced without losing polarization of the fiber. The optical fiber connectors are fully field-usable and serviceable and the process of polarizing the fibers is rapidly and economically accomplished with a minimum of equipment.

BRIEF DESCRIPTION OF THE DRAWINGS

FIG. is a longitudinal sectional view of the optical fiber connector arrangement of this invention;

FIG. 2 is a fragmentary perspective view of the rearward portion of the connector body, illustrating the manner in which the optical fiber terminus is rotated for achieving predetermined polarization of the fiber;

FIG. 3 is a view similar to FIG. 2, but with the terminus bonded to the aligning sleeve; and FIG. 4 is a perspective view of multi-channel optical fiber connector constructed in accordance with this invention.

DESCRIPTION OF THE PREFERRED EMBODIMENTS

Shown in FIG. 1 is an optical fiber connector 10 which is used for obtaining proper rotational alignment of an optical fiber terminus for a polarization preserving fiber. This connector is for the purpose of achieving correct fiber polarization rather than for use in an operational system. The connector 10 includes a pin terminus section 11 that mates with a socket terminus section 12.

The pin terminus section 11 includes a connector body 13 having an opening 14 through it which receives a pin terminus 15 which, except for its rearward end, as will be explained below, is of conventional design. A retaining clip 16 fits within an intermediate section 17 of the opening 14, which is of reduced diameter, to hold the pin terminus 15 against movement rearwardly of the connector body 13. The retainer clip 16 includes a flared flange 19 at its forward end which engages the shoulder formed where the reduced diameter section 17 connects to the forward portion of the opening 14. Slots 20 in the retainer clip 17 allow it to be contracted so that the terminus 15 may be inserted and removed. A shoulder 22 on the terminus 15 is adjacent the rearwardly facing shoulder of the connector body 13 where the reduced diameter section 17 connects to the rearward portion of the opening 14. This limits forward movement of the terminus 15. An O-ring 23 circumscribes the rearward portion of the terminus 15 so that the interface of a connector receiving the terminus can be environmentally sealed.

Within the terminus 15 is an optical fiber 24 of the polarization preserving type. The optical fiber 24 is held within the terminus body by an adhesive, such as epoxy.

The socket terminus 26 fits within an opening 27 in the socket connector body 28 where it is held by a retaining clip 29 in a reduced diameter portion 30 of the opening The clip 29 is identical to &.he clip 17. A polarization preserving fiber 32 is held by epoxy within the socket terminus body 33. The socket terminus 26 includes a forwardly projecting sleeve 34 that extends beyond the ceramic alignment bushing 35 at the forward end of the socket terminus, receiving the alignment bushing 36 of the pin terminus 15. This positions the polished forward end face 37 of the socket terminus 26 adjacent the polished forward end face 38 of the pin terminus 15.

A stack of Bellevill ®washers 40 circumscribes the pin terminus body, one end of the stack engaging a washer 41 adjacent the retaining clip 19 and the other end engaging a sleeve 42 that fits around the pin terminus body. The Belleville washers 40, reacting through the sleeve 42, the forward end of which bears against the ceramic alignment bushing 36, bias the forward end face 38 of the pin terminus against the forward end face 37 of the socket terminus.

In this example, the socket terminus 26 has been rotated so that the optical fiber 32 has a predetermined polarization relative to the connector body 28. This can be accomplished by conventional instrumentation. The socket terminus 26 is fixed in this rotational position. The rotational position of the optical fiber 24 in the pin terminus 15 has not been established, however.

Circumscribing the pin terminus body adjacent its rearward end is a sleeve 44 which has a counterbore 45 in its forward end to receive the portion 46 of the pin terminus body which is of relatively large diameter. An additional counterbore 47 extends into the rearward end of the sleeve 44. The central portion 48 of the bore of the sleeve 44 closely receives the reduced diameter rearward end portion 49 of the pin terminus body.

The forward end portion of the sleeve 44 is provided with an enlarged hexagonal exterior surface 51 which is complementarily received in a hexagonal recess 52 at the rearward end of the opening 14. These hexagonal surfaces provide abutments that prevent rotation cf the sleeve 44 relative to the connector body 13. The sleeve 44 is given a predetermined rotational position relative to the connector body 13 by means of an identifying mark 53 on the sleeve 44 which is aligned with an identifying mark 54 on the rearward end of the connector body 13 as the sleeve end is inserted into the recess 52.

In achieving polarization, a light signal is transmitted through the optical fibers 24 and 32. The pin terminus 15 is rotated, and with it the fiber 24, to the position where the signal through the fibers reaches its peak. This signifies that the fiber 24 turn is in correct rotational alignment with the fiber 32. The rotation of the optical terminus 15 is facilitated by providing a hexagonal surface 55 on the rearward end of the pin terminus body.

Any other suitable instrumentation for establishing the polarity of the fiber 24 upon rotation of the terminus 15 may be employed in lieu of the fiber 32 illustrated.

After the correct polarization of the fiber 24 has been achieved, an adhesive 57, such as an epoxy resin, is injected into the space around the connector body portion 49 at the counterbore 47 A small O-ring 58 around the terminus body portion 46 assures that no adhesive will bleed past the rearward end portion of the pin terminus toward the interface of the connector. The adhesive 57 is permitted to cure, thereby locking the pin terminus body to the sleeve 44. This establishes a relationship between the rotational position of the sleeve 44 and the polarization of the optical fiber 24.

The socket terminus 26 may be held in its predetermined rotational alignment by conventional means or through the provisions of this invention. The latter arrangement is illustrated, with a sleeve 44 being provided at the rearward end of the connector body 28. The sleeve 44 for the socket terminus is bonded to this terminus by an epoxy adhesive 57 and the hexagonal forward end 51 is received within a complementary socket 60 in the rearward end of the connector body 28. In keeping with this arrangement, an O-ring 61 circumscribes the terminus body, and a hexagonal section 62 is included at the rearward end of the terminus body to facilitate its rotation.

After being aligned rotationally, the pin terminus 15 is removed from the connector body 13 and is ready for association with an operational optical fiber connector. Other pin termini 15 are introduced into the connector body 13 and aligned and fixed to their sleeves in the manner described above. As shown in FIG. 4, six such pin termini 15 are associated with an optical fiber connector body 64. The openings in the connector body 64 for the termini 15 include rearward hexagonal recesses 65 which receive the hexagonal ends 51 of the sleeves 44. The markings 53 on the sleeves 44 all are aligned with marking 66 on the rearward face of the connector body 64, the openings 66 all being at the upper edges of the hexagonal recesses 65 as the device is illustrated. This means that all of the pin termini 15 received in the connector body 64 have the same polarization for their fibers which is that established by the aligning steps in the connector 10.

Polarization of socket termini 26 is accomplished i the same manner as for the pin termini 15. In the arrangement shown in FIG. 1, if the socket terminus 26 is to be aligned rotationally the pint terminus 15 will be the cone that is already fixed in rotational position with a known polarization of its optical fiber 24. The procedure in aligning the socket terminus 26 is the same as that described for the pin terminus 15. Consequently, it is preferred to provide one connector section 12 with a socket terminus locked at predetermined rotational alignment for enabling the alignment of the pin termini 15 to be accomplished, and to have a second connector section 11 with a pin terminus 15 held at a fixed polarization for permitting rotational alignment of the socket termini 26 for a connector. This enables the connector to be assembled with the optical fibers polarized uniformly, while permitting any of the termini to be removed and replaced or returned to their positions without sacrificing proper polarization. In FIG. 4, several socket termini 26 have been given predetermined polarization relative to a connector body 67 which is mated with the connector section 64. The termini 26 are given the same polarization as the termini 15 by the procedure described above.

If desired, polarization may be accomplished in operational connectors using the same technique. In that event, one terminus will first be fixed rotationally and the mating terminus will be rotated to correctly polarize its optical fiber. Polarization of two mating fibers can be achieved whether or not the rotational position of the fixed fiber is known.

Rather than using a hexagonal shape for the sockets in the connector body and the sleeve end, other noncircular contours may be used. For example, the sleeve end and socket that receives it may be circular except for a flat so that only one relative rotational position is possible.

What is claimed is:

1. The method of achieving predetermined polarization of an optical fiber comprising the steps of
   positioning a polarization preserving optical fiber in an optical fiber terminus,
   associating with said optical fiber terminus a member such that said terminus is rotatable relative to said member,
   forming an opening in a body,
   positioning said optical fiber terminus in said opening,
   locating said member in a predetermined rotational position relative to said body,
   then rotating said optical fiber terminus relative to said member and to said body to a rotational position in which said optical fiber has predetermined polarization, and
   then rotationally locking said member to said optical fiber terminus, whereby said optical fiber terminus and said member can be removed from said body and said optical fiber can be given a predetermined polarization by locating said member in a predetermined rotational position.

2. The method as recited in claim 1 in which for rotationally locking said member to said optical fiber terminus an adhesive is applied to said member and said optical fiber terminus.

3. The method as recited in claim 2 in which said member is formed as a sleeve, said sleeve is provided with a counterbore, and said adhesive is introduced into said counterbore.

4. The method as recited in claim 3 including, in addition, the step of providing sealing means between said sleeve and said optical fiber terminus inwardly of said counterbore for preventing the flow of said adhesive beyond said sealing means.

5. The method as recited in claim 4 in which said optical fiber terminus is provided with a surface outwardly of said sleeve for engagement by an implement for rotating said terminus relative to said sleeve and to said body.

6. The method as recited in claim 1 in which a plurality of such polarization preserving optical fibers are so given a predetermined polarization, and said plurality of polarization preserving optical fibers are installed in an optical fiber connector body with all having the same polarity by positioning said members of said plurality of polarization preserving optical fibers in the same rotational position relative to said optical fiber connector body.

7. The method as recited in claim 1 in which for said cooperative means said body and said member are provided with interengageable surfaces which rotatably index said member relative to said body.

8. The method of achieving predetermined polarization of a polarization preserving optical fiber comprising the steps of
   positioning a polarization preserving optical fiber in an optical fiber terminus,
   extending around said optical fiber terminus a member which is rotatable relative to said terminus,
   forming an opening in a body,
   positioning said optical fiber terminus in said opening,
   forming cooperative abutment means on said member and said body,
   locating said member relative to said body in a predetermined rotational position by said cooperative abutment means,
   rotating said optical fiber terminus relative to said member and to said body to a rotational position in which said optical fiber has predetermined polarization, and
   then bonding said member to said optical fiber terminus such that said optical fiber terminus and said member can be removed from said body and said optical fiber can be given said predetermined polarization upon similar association of said optical fiber terminus and said member with any such body.

9. The method as recited in claim 8 in which for said cooperative abutment means there is provided a noncircular recess in said body, said member is provided with a part complementary to said recess, and said part of said member is positioned in said recess.

10. The method as recited in claim 8 in which said member is formed as a sleeve, and for said cooperative abutment means a noncircular socket is provided in said body at one end of said opening, and said sleeve is provided with an end portion having a surface complementary to said socket, said end portion of said sleeve being inserted into said socket for so locating said member in a predetermined rotational position.

11. The method as recited in claim 8 including the steps of forming an opening in a second body, forming abutment means on said second body, removing said optical fiber terminus from said first mentioned body, positioning said optical fiber terminus in said second body, and locating said member relative to said second body in a predetermined rotational position by said abutment means of said member and said abutment means of said second body, whereby said optical fiber is given a predetermined polarization relative to said second body.

12. The method of achieving predetermined polarization of a polarization preserving optical fiber comprising the steps of
   providing a first optical fiber connector section,
   positioning a first polarization preserving optical fiber in said first connector section such that said first optical fiber has a predetermined polarization,
   providing a second optical fiber connector section that includes a body having an opening therethrough, an optical fiber terminus in said opening and a second polarization preserving optical fiber in said optical fiber terminus and secured thereto,
   associating with said optical fiber terminus a member such that said terminus is rotatable relative to said member,
   locating said member in a predetermined rotational position relative to said body,
   connecting said first optical fiber connector section to said second optical fiber connector section so that the ends of said first and second optical fibers are in abutment, rotating said optical fiber terminus relative to said member and to said body to a rotational position in which said second optical fiber has predetermined polarization with respect to said first optical fiber, and then fixing said member on said optical fiber terminus such that said optical fiber terminus and said member can be removed from said body and said second optical fiber can be given a predetermined polarization by positioning said optical fiber terminus in an opening in a body and locating said member in predetermined position relative to said last mentioned body.

* * * * *